Figure 1:
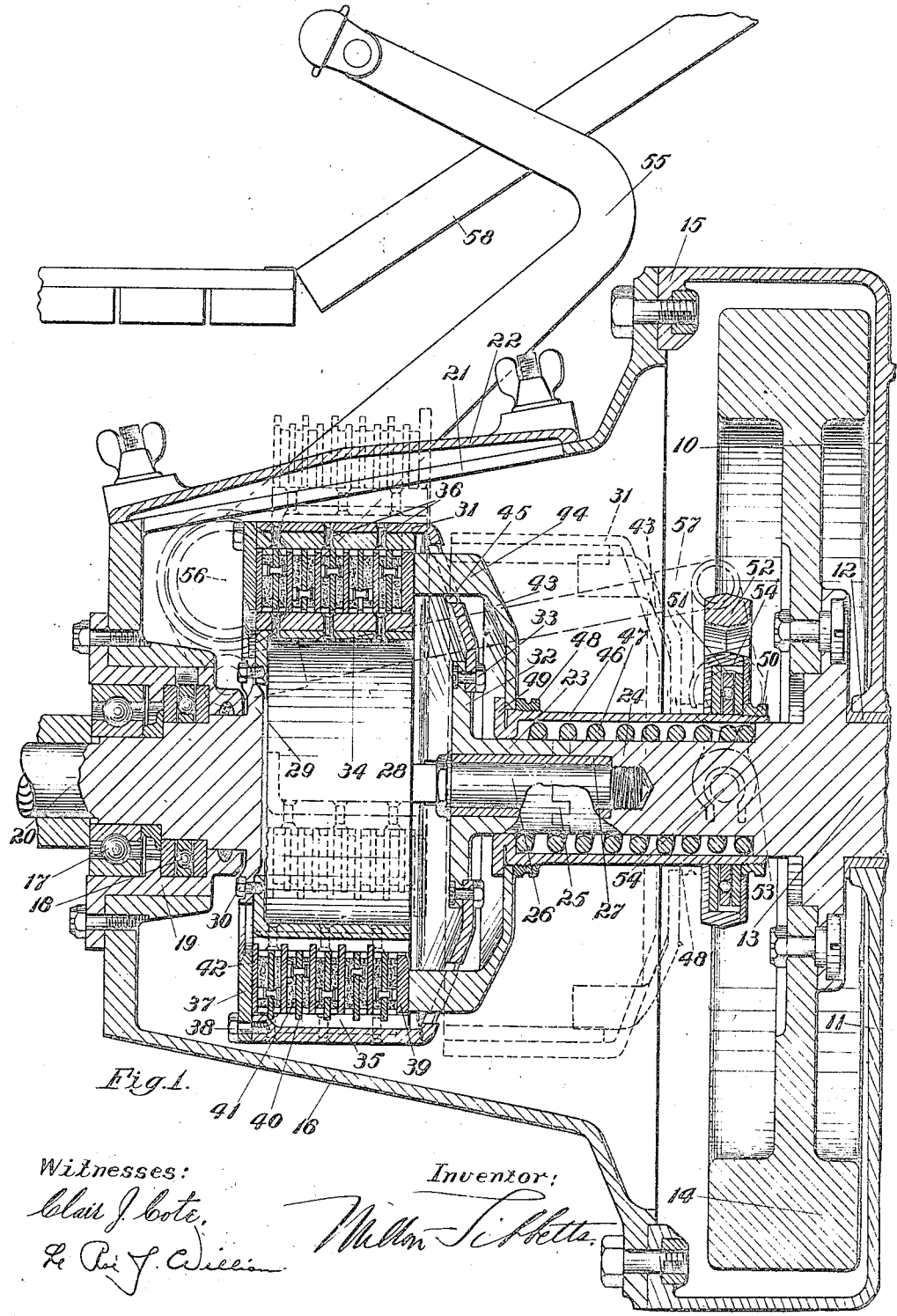

M. TIBBETTS.
MOTOR VEHICLE.
APPLICATION FILED NOV. 27, 1914.

1,305,029.

Patented May 27, 1919.
2 SHEETS—SHEET 1.

Witnesses:
Blair J. Cote.
Le Roi J. Willian

Inventor:
Milton Tibbetts

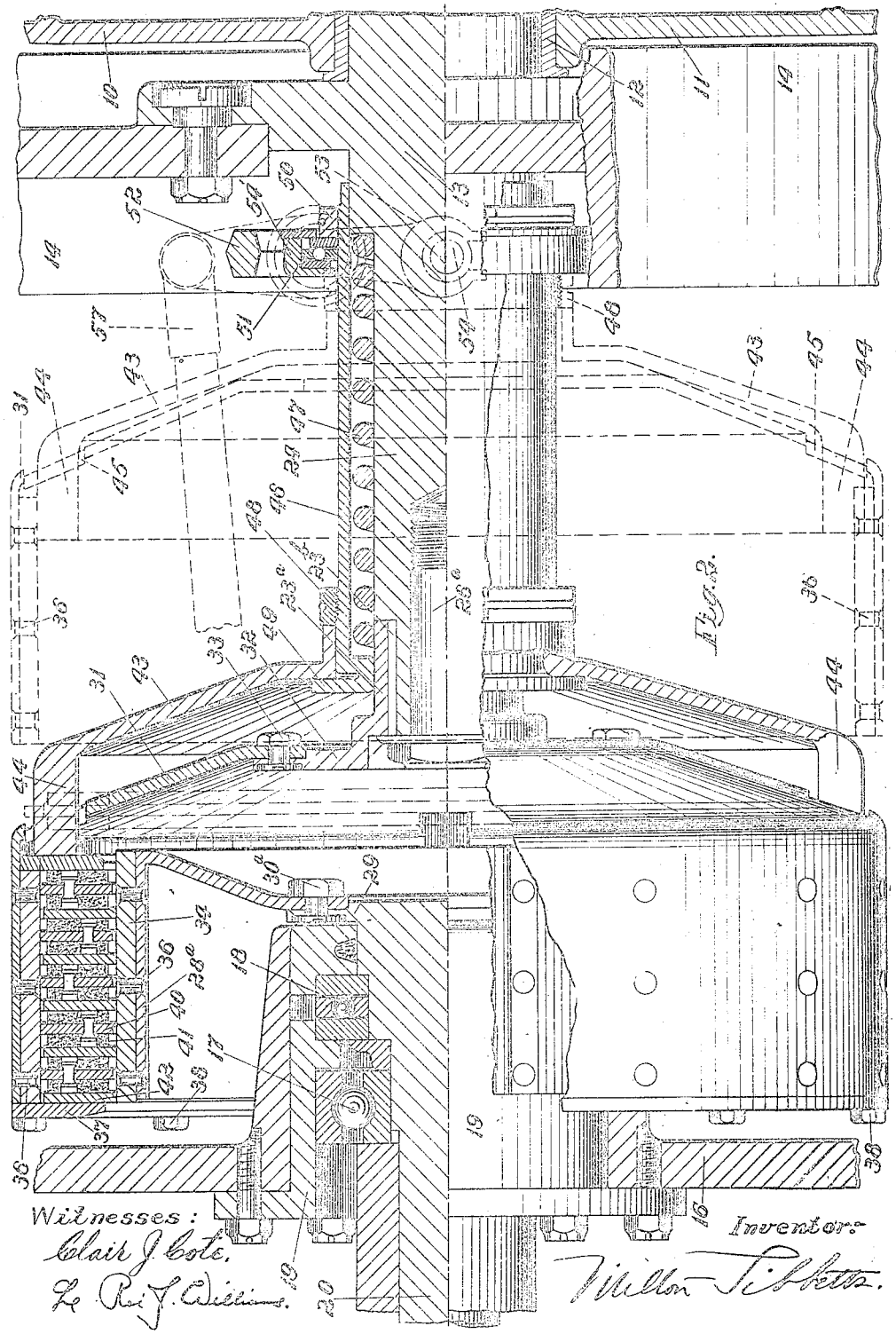

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,305,029.  Specification of Letters Patent.  Patented May 27, 1919.

Application filed November 27, 1914. Serial No. 874,231.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to motor vehicles and particularly to the clutch mechanism thereof.

The clutch mechanism herein shown is of the friction type in which a spring is provided for holding the clutch elements in frictional contact for driving a driven shaft from a driving shaft. Suitable connections are provided for compressing the spring manually for releasing the clutch. In this type of clutch the engaging parts are subject to wear and it is desirable to have those parts removable for the purpose of renewing or repairing them.

One of the objects of the present invention is to so arrange the parts of a clutch mechanism comprising driving and driven shafts and coöperating clutch elements that the parts of the clutch which are subject to wear may be removed and replaced between the more or less adjacent ends of the driving and driven shafts.

Another object of the invention is to simplify the construction of clutch mechanisms of the above referred to type and to make them more easily assembled and disassembled.

Other objects of the invention will appear from the following description taken in connection with the drawings which form a part of this specification, and in which:—

Figure 1 is a longitudinal section through a clutch mechanism embodying this invention; and Fig. 2 is a somewhat similar enlarged view of another form of the invention, parts being shown in elevation.

Referring to the drawings, a supporting structure for the clutch mechanism is shown in the form of a casing, which in the form of the invention illustrated in Fig. 1, is a portion of the base or crank case of the motor of a motor vehicle. 10 is the upper part and 11 the lower part of this crank case and between these parts is supported a bearing 12 for the motor crank shaft 13. 14 is the motor fly wheel secured to the crank shaft 13 and housed in an extended portion of said crank case. This extended portion 15 of the crank case has a separately formed detachable part 16, which in fact forms the clutch housing. The part 16 also supports the annular ball bearing 17 and thrust bearing 18, which are alined with the bearing 12 for the crank shaft 13. A sleeve 19 detachably secured to the part 16 as shown makes the bearings 17 and 18 removable from said part 16 as a unit. It will be seen that these bearings support a shaft 20 which is thereby alined with the crank shaft 13, and for the purposes of this invention the shaft 13 may be termed the driving shaft and the shaft 20 the driven shaft.

The part 16 or clutch casing is formed with an opening 21 in its upper wall, which opening is of suitable size to admit the various parts of the clutch hereinafter described. It is closed by a removable cover 22 as shown.

The crank shaft or driving shaft 13 extends some distance toward the driven shaft and is formed with a detachable end section or piece 23. The main part or section 24 of the driving shaft and the end section 23 are each formed with interlocking teeth 25 and are rigidly but detachably connected by a bolt 26 surrounded by a pilot sleeve 27. This makes a very secure but detachable connection between the sections 23 and 24 of the driving shaft.

It will be seen that while the shafts 13 and 20 are in alinement, yet their more or less adjacent ends are separated by a space slightly larger than the width of the inner clutch element hereinafter described. The clutch shown in this form of the invention is of the plate or disk type and the main clutch members are in the form of inner and outer drums, the inner drum 28 being secured to a flange 29 on the driven shaft 20, as by bolts 30, and the outer drum 31 being secured to a flange 32 on the driving shaft 13 as by bolts 33. Keys 34 and 35 are secured to the inner and outer drums or clutch members respectively, rivets 36 being shown for the purpose. An end plate 37 is detachably secured to the rearward end of the outer drum by the bolts 38. Another end plate 39 is provided with suitable keyways so that it may slide on the keys 35 inside of the outer drum. A series of clutch plates or disks 40 are provided with keyways and arranged to slide in the outer drum and to turn with the outer drum by reason of the keys 35 thereof. These plates 40 are faced on both sides with asbestos 41 or other suitable lining material.

Alternately arranged with the plates 40 are plates 42 which are similarly keyed to the inner clutch drum.

It will be understood that when the plate 39 is pressed toward the plate 37 the alternating clutch plates will be pressed into close frictional contact and a driving connection will be made between the outer and the inner clutch members. For the purpose of thus pressing the plates together, a clamping piece 43 is provided having clamping fingers 44 which extend through suitable openings 45 formed in the web portion of the outer clutch member or drum and into contact with the plate 39. The clamping piece 43 is detachably secured to a sleeve 46, which slides on the driving shaft 13 as shown and is actuated by a spring 47 surrounding the sections 23 and 24 of the driving shaft 13 and within said sleeve 46. A nut 48 secures the clamping piece to the sleeve against a shoulder 49 at the rearward end of said sleeve. A nut 50 at the forward end of the sleeve forms an abutment for a thrust bearing 51, through which the sleeve 46 is operated manually to compress the spring 47 and thereby release the clutch. A suitable yoke 52 has fingers 53, shown in dotted lines, which act upon trunnions 54 on a ring 54' surrounding the thrust bearing 51. The yoke is pivoted as shown in dotted lines and is actuated by a pedal lever 55 pivoted at 56 and connected to the yoke by a rod 57. The lever 55 extends through the motor vehicle floor board 58 in suitable position for operation by the vehicle driver.

It will be understood that the clutch is released by depressing the pedal lever 55 which draws the rod 57 rearwardly and throws the sleeve 46 forwardly, thus compressing the spring 47 and permitting the plates on the clutch members to rotate independently, or permit one set of said plates to rotate and the other to remain stationary.

It will also be seen that by thus releasing the clutch and blocking the pedal lever 55 the nut 48 may be backed off and the clamping piece 43 may be moved forwardly to the position shown in dotted lines in Fig. 1. The outer clutch member 31 may then be disconnected from the flange 32, the plate 37 detached, and the member 31 moved forwardly also to the position shown in dotted lines. With the clamping piece and outer clutch member in the positions shown in dotted lines the bolts 30 may be taken out and the inner clutch member and all of the plates thereon can be removed bodily, laterally through the space provided between the driving and driven shafts.

It will be observed further that there is sufficient space between the forward end of the inner clutch drum and the rearward end of the driving shaft for the removal of the clutch plates separately including the plates 37 and 39, by simply sliding them forwardly on the inner clutch member and then removing them laterally through that space. Thus, the clutch plates may be easily removed and repaired and replaced.

The inner clutch member and the plates thereon are indicated in dotted lines as they would appear being removed bodily through the space described. It will be understood of course that the cover 22 will be taken off for that purpose.

After the inner clutch drum and the plates have been removed, the bolt 26 is then accessible and by removing it, the end section 23 of the driving shaft and the sleeve 27 may also be removed. The outer clutch drum 31 may then be moved rearwardly from its telescoped position and removed laterally through the enlarged space between the rear end of the sleeve 46 and the forward end of the driven shaft 20. By then removing the nut 50, the sleeve 46 may be drawn rearwardly together with the spring 47 and removed laterally through the space provided between the rear end of the section 24 of the driving shaft and the forward end of the driven shaft 20. The clamping piece 43 may then be removed in like manner.

The parts may be assembled by reversing the operation above described.

Referring to Fig. 2, it will be seen that the supporting structure comprises the parts 10, 11 and 16, which are similar to the structure shown in Fig. 1. Other parts of the supporting structure are not shown in Fig. 2. Other parts of the clutch mechanism which are similar to those shown in Fig. 1 have the same numerals indicating them.

In the Fig. 2 construction, only the plates are removable laterally through the space provided between the adjacent ends of the driving and driven shafts. The inner drum 28$^a$ is secured to the driven shaft 20 by the bolts 30$^a$ and the outer clutch member 31 is secured to a flange on the end section 23$^a$ of the driving shaft by similar bolts 33. The section 23$^a$ is shown as keyed to the driving shaft 13 by a key 23$^b$ and secured thereto by a suitable bolt 26$^a$.

The clamping piece 43 is like that shown in Fig. 1 and is similarly secured to the sleeve 46.

It will be understood that the clamping piece 43 and the outer clutch member 31 may be moved forwardly to the respective positions in which they are shown in dotted lines and each of the clutch plates may then be moved forwardly and withdrawn laterally through the space provided between the ends of the driving and driven shafts. One of the plates is shown in dotted lines in position for being withdrawn. The plates may then be relined and replaced or new ones inserted.

It will be understood that other forms of the invention may be devised without departing from its scope.

Having thus described my invention, what I claim and desire to secure by Letters Patent is:—

1. In a motor vehicle, the combination with the motor crank case having a bearing for the crank shaft and an extended portion supporting another bearing alined with the first bearing, of a crank shaft supported in the first said bearing and having an extension beyond that bearing, a driven shaft supported in the bearing in the extended portion and separated from said extension, inner and outer clutch members on said shafts respectively, clutch plates engaging to form a driving connection between said members, and means whereby said plates may be removed laterally.

2. In a clutch mechanism, in combination, a supporting structure, spaced bearings arranged in alinement in said structure, driving and driven shafts mounted in said bearings and axially spaced from each other, inner and outer clutch members on said shafts respectively extending over said space, clutch plates frictionally engaging to form a driving connection between said members, and means permitting relative axial movement of the clutch members to uncover said space for the purpose described.

3. In a clutch mechanism, in combination, a supporting structure, spaced bearings arranged in alinement in said structure, driving and driven shafts mounted in said bearings, inner and outer clutch members on said shafts respectively, laterally removable, clutch plates frictionally engaging to form a driving connection between said members, and means whereby the clutch members may be separated axially to permit lateral removal of the clutch plates.

4. In a clutch mechanism, in combination, a supporting structure, spaced bearings arranged in alinement in said structure, driving and driven shafts mounted in said bearings, inner and outer clutch members on said shafts respectively, clutch plates frictionally engaging to form a driving connection between said members, and means connecting said parts and permitting the withdrawal of the outer clutch member on its shaft so that the inner clutch member and plates may be bodily removed laterally without removing the outer clutch member.

5. In a clutch mechanism in combination, a supporting structure, spaced bearings arranged in alinement in said structure, driving and driven shafts mounted in said bearings, inner and outer clutch members on said shafts respectively, clutch plates frictionally engaging to form a driving connection between said members, and means connecting said parts and permitting the axial withdrawal of the outer clutch member so that the inner clutch member and plates may be bodily removed laterally without removing the outer clutch member, and without movement of said shafts in their bearings.

6. In a clutch mechanism, in combination, a driving shaft, a driven shaft alined therewith and axially separated therefrom, leaving a space between the ends of said shafts, inner and outer clutch members on said shafts respectively, clutch plates adapted to engage to form a driving connection between said members, and means whereby one of said clutch members may be moved axially to permit removal of the plates laterally through said space.

7. In a clutch mechanism, in combination, a driving shaft, a driven shaft alined therewith and axially separated therefrom, leaving a space between the ends of said shafts, inner and outer clutch members on said shafts respectively, clutch plates adapted to engage to form a driving connection between said members, and means whereby one of said clutch members may be moved axially to permit removal of the other member and said plates laterally through said space.

8. In a clutch mechanism, in combination, a driving shaft, a driven shaft alined therewith and axially separated therefrom, leaving a space between the ends of said shafts, inner and outer clutch members on said shafts respectively, clutch plates adapted to engage to form a driving connection between said members, and means whereby one of said clutch members may be moved axially to permit removal of the other member through said space.

9. In a clutch mechanism, in combination, a driving shaft, an independently mounted alined driven shaft axially separated therefrom leaving a space between the ends of the shafts, inner and outer clutch members over-hanging said space, clutch plates for forming a driving connection between said members, and means detachably connecting said members to said shafts respectively, so that one of said members may be telescoped with its shaft to permit removal of the clutch plates laterally through said space.

10. In a clutch mechanism, in combination, a driving shaft, a driven shaft alined therewith and axially separated therefrom, clutch members on the driving and driven shafts respectively, clutch plates for forming a driving connection between said members, a clamping piece for pressing said plates together, a sleeve on one of said shafts for operating said clamping piece, a spring for actuating said sleeve, and means connecting said sleeve and clamping piece to permit telescoping of the clamping piece and one of said clutch members with the shaft on which said sleeve is mounted, whereby the clutch plates may be removed laterally between the ends of the shafts.

11. In a clutch mechanism, in combination, a driving shaft having a detachable end section, a driven shaft alined therewith, and axially separated therefrom, a clutch member detachably secured to the detachable end section, a clutch member detachably secured to the driven shaft, clutch plates for forming a driving connection between said members, a clamping piece for pressing said plates together, a sleeve on the driving shaft to which said clamping piece is detachably connected, a spring for actuating said sleeve, and means for manually shifting said sleeve against said spring to release the clutch.

12. In a clutch mechanism, in combination, a driving shaft having a detachable end section, a driven shaft alined therewith and axially separated therefrom, a clutch member detachably secured to the detachable end section, a clutch member detachably secured to the driven shaft, clutch plates for forming a driving connection between said members, a clamping piece for pressing said plates together, a sleeve on the driving shaft to which said clamping piece is detachably connected, a spring for actuating said sleeve, and means for manually shifting said sleeve against said spring to release the clutch, the parts being so arranged that the clamping piece and driving clutch member may be detached from their respective supports and moved axially on the driving shaft to permit removal of the plates and other clutch member laterally between the ends of the shafts.

13. In a clutch mechanism, in combination, a driving shaft having a detachable end section, a driven shaft alined therewith and axially separated therefrom, a clutch member detachably secured to the detachable end section, a clutch member detachably secured to the driven shaft, clutch plates for forming a driving connection between said members, a clamping piece for pressing said plates together, a sleeve on the driving shaft to which said clamping piece is detachably connected, a spring for actuating said sleeve and means for manually shifting said sleeve against said spring to release the clutch, the parts being so arranged that the driven clutch member, the driving clutch member and the clamping piece may be removed in order laterally between the ends of the shafts.

In testimony whereof I affix my signature in the presence of two witnesses.

MILTON TIBBETTS.

Witnesses:
  Le Roi J. Williams,
  Clair J. Cote.